(12) United States Patent
Shimizu et al.

(10) Patent No.: US 10,090,761 B2
(45) Date of Patent: Oct. 2, 2018

(54) POWER CONVERSION APPARATUS

(71) Applicant: DENSO CORPORATION, Kariya, Aichi-pref. (JP)

(72) Inventors: Hiroshi Shimizu, Kariya (JP); Mitsunori Kimura, Kariya (JP); Kengo Mochiki, Kariya (JP); Yuu Yamahira, Kariya (JP); Tetsuya Matsuoka, Kariya (JP); Kazuma Fukushima, Kariya (JP); Yasuyuki Ohkouchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/490,305

(22) Filed: Apr. 18, 2017

(65) Prior Publication Data

US 2017/0302181 A1 Oct. 19, 2017

(30) Foreign Application Priority Data

Apr. 19, 2016 (JP) ................................. 2016-084053

(51) Int. Cl.
*H02M 3/158* (2006.01)
*H02M 7/5387* (2007.01)
*H02P 27/06* (2006.01)
*H02M 1/00* (2006.01)

(52) U.S. Cl.
CPC ......... *H02M 3/158* (2013.01); *H02M 7/5387* (2013.01); *H02M 2001/0051* (2013.01); *H02M 2001/0054* (2013.01); *H02P 27/06* (2013.01)

(58) Field of Classification Search
CPC ................. H02M 3/156; H02M 3/158; H02M 2003/156; H02M 2003/158; H02M 2001/0051; H02M 2001/0054; H02P 27/06

See application file for complete search history.

(56) References Cited

U.S. PATENT DOCUMENTS

| 9,520,802 B2* | 12/2016 | Tanaka | B60L 3/003 |
| 2011/0013438 A1* | 1/2011 | Frisch | H02M 7/48 363/131 |
| 2014/0334208 A1* | 11/2014 | Nguyen | H02M 3/155 363/126 |
| 2016/0204648 A1* | 7/2016 | Kawamura | H02J 7/0077 320/107 |
| 2017/0373586 A1* | 12/2017 | Zhang | H02M 1/088 |

FOREIGN PATENT DOCUMENTS

| JP | 2013-223357 A | 10/2013 |
| JP | 2016-039639 A | 3/2016 |

* cited by examiner

*Primary Examiner* — Matthew Nguyen
(74) *Attorney, Agent, or Firm* — Oliff PLC

(57) ABSTRACT

A power conversion apparatus includes a first semiconductor element pair that includes a MOSFET made of wide bandgap semiconductor material and a wide bandgap diode made of wide bandgap semiconductor material which is reverse parallel-connected to the MOSFET, a second semiconductor element pair that includes an IGBT made of silicon semiconductor material and a silicon diode made of silicon semiconductor material which is reverse parallel-connected to the IGBT, and a control circuit section for controlling switching operation of the MOSFET and the IGBT. The first and second semiconductor element pairs are connected in series to each other.

9 Claims, 23 Drawing Sheets

POWER CONVERSION APPARATUS

This application claims priority to Japanese Patent Application No. 2016-84053 filed on Apr. 19, 2016, the entire contents of which are hereby incorporated by reference.

BACKGROUND OF THE INVENTION

1. Field of the Invention

The present invention relates to a power conversion apparatus.

2. Description of Related Art

A general power conversion apparatus includes switching elements and a control circuit section for controlling the operation of the switching elements. IGBTs made of silicon semiconductor material are used as the switching elements, for example. The control circuit section causes the IGBTs to perform switching operation to perform electric power conversion.

There is a demand for reducing the loss of switching elements of a power conversion apparatus as described above. To address such a demand, it is proposed to use MOSFETs made of wide bandgap semiconductor material such as SiC or GaN instead of IGBTs made of silicon semiconductor material. The on-resistance of the IGBT is large in a small-current area because there is diffusion potential. On the other hand, the on-resistance of the MOSFET is small even in a small-current area because there is no diffusion potential. Accordingly, it is possible to reduce the loss of the power conversion apparatuses by using the MOSFET.

Also, it is proposed to use wide bandgap semiconductor material as material of a diode to be reverse parallel-connected to the MOSFET to reduce the recovery loss of the diode to thereby further reduce the entire loss of the power conversion apparatus.

However, the MOSFET or diode made of wide bandgap semiconductor material is expensive compared to the IGBT or diode made of silicon semiconductor material. Accordingly, the manufacturing cost of the power conversion apparatus increases considerably if all the elements thereof are made of wide bandgap semiconductor material.

SUMMARY

An exemplary embodiment provides a power conversion apparatus including:

a first semiconductor element pair including a MOSFET made of wide bandgap semiconductor material and a wide bandgap diode made of wide bandgap semiconductor material and reverse parallel-connected to the MOSFET;

a second semiconductor element pair including an IGBT made of silicon semiconductor material and a silicon diode made of silicon semiconductor material which is reverse parallel-connected to the IGBT; and a control circuit section for controlling switching operation of the MOSFET and the IGBT, the first and second semiconductor element pairs being connected in series to each other.

According to the exemplary embodiment, there is provided at low cost a power conversion apparatus whose switching loss is small.

Other advantages and features of the invention will become apparent from the following description including the drawings and claims.

PREFERRED EMBODIMENTS OF THE INVENTION

First Embodiment

Figure 1:
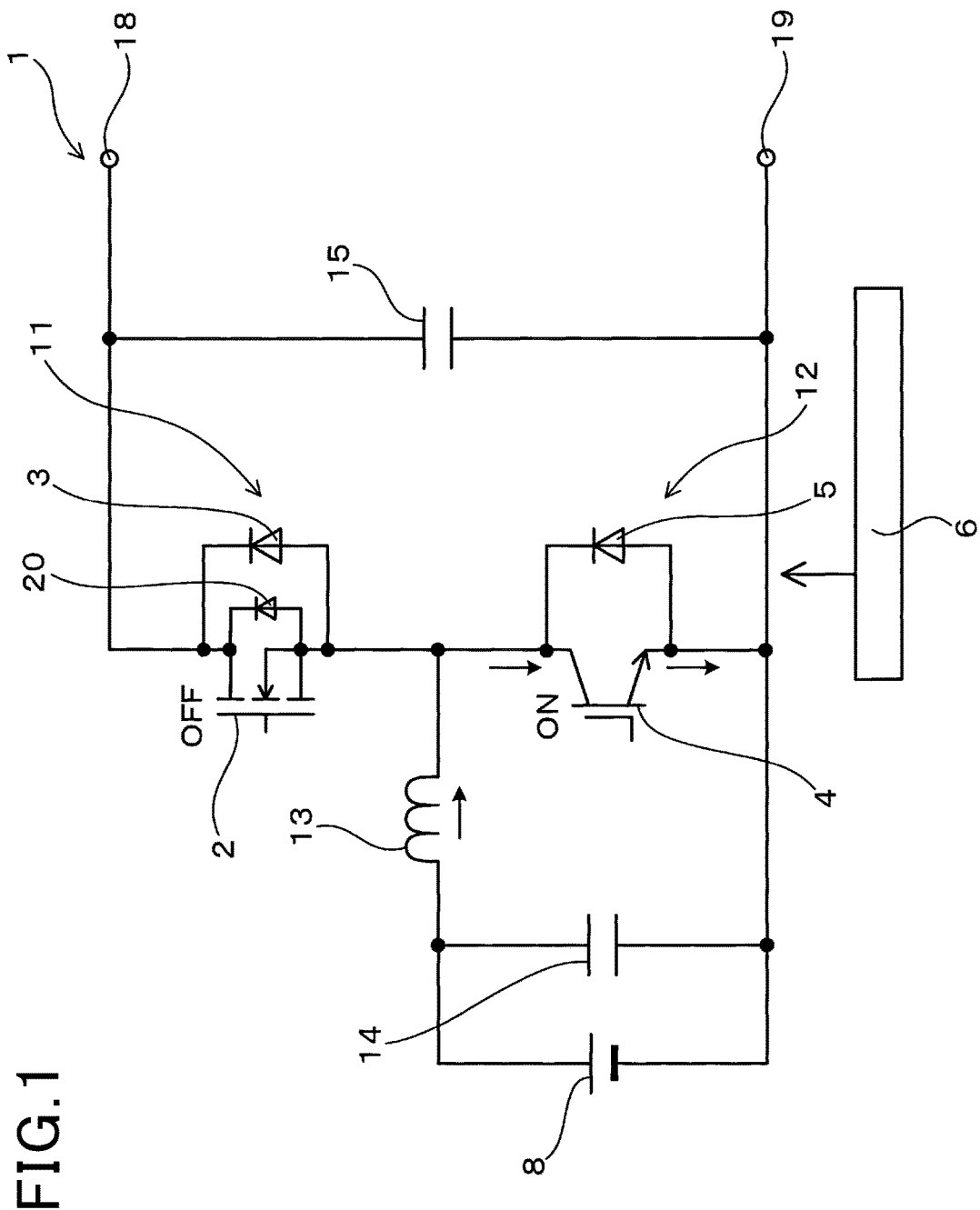
FIG. 1 is a circuit diagram of a power conversion apparatus according to a first embodiment of the invention in a state where the IGBT of the lower arm thereof is on during a stepup discharge mode.

A power conversion apparatus 1 according to a first embodiment of the invention, which can be mounted on an electric vehicle or a hybrid vehicle, is described with reference to FIGS. 1 to 9. As shown in FIG. 1, the power conversion apparatus 1 includes a first semiconductor element pair 11, a second semiconductor element pair 12 and a control circuit section 6. The first semiconductor element pair 11 is comprised of a MOSFET 2 made of wide bandgap semiconductor material and a wide bandgap diode 3 made of wide bandgap semiconductor material. The wide bandgap diode 3 is reverse parallel-connected to the MOSFET 2. In this embodiment, a Schottky barrier diode having a Schottky junction is used as the wide bandgap diode 3.

The second semiconductor element pair 12 is comprised of an IGBT 4 made of silicon semiconductor material and a silicone diode 5 made of silicon semiconductor material. The silicone diode 5 is reverse parallel-connected to the IGBT 4.

The control circuit section 6 controls the switching operations of the MOSFET 2 and IGBT 4. The first semiconductor element pair 11 and the second semiconductor element pair 12 are connected in series to each other.

The power conversion apparatus 1 is used as a DC-DC converter for stepping up the voltage of a DC power source 8 of a vehicle which may be an electric vehicle or a hybrid vehicle.

As shown in FIG. 1, the power conversion apparatus 1 includes a filter capacitor 14, a reactor 13 and a smoothing capacitor 15. The first semiconductor element pair 11 is disposed in the upper arm, and the second semiconductor element pair 12 is disposed in the lower arm. The IGBT 4 of the second semiconductor element pair 12 disposed in the lower arm is caused to perform switching to step up the DC voltage of the DC power source 8.

Figure 9:
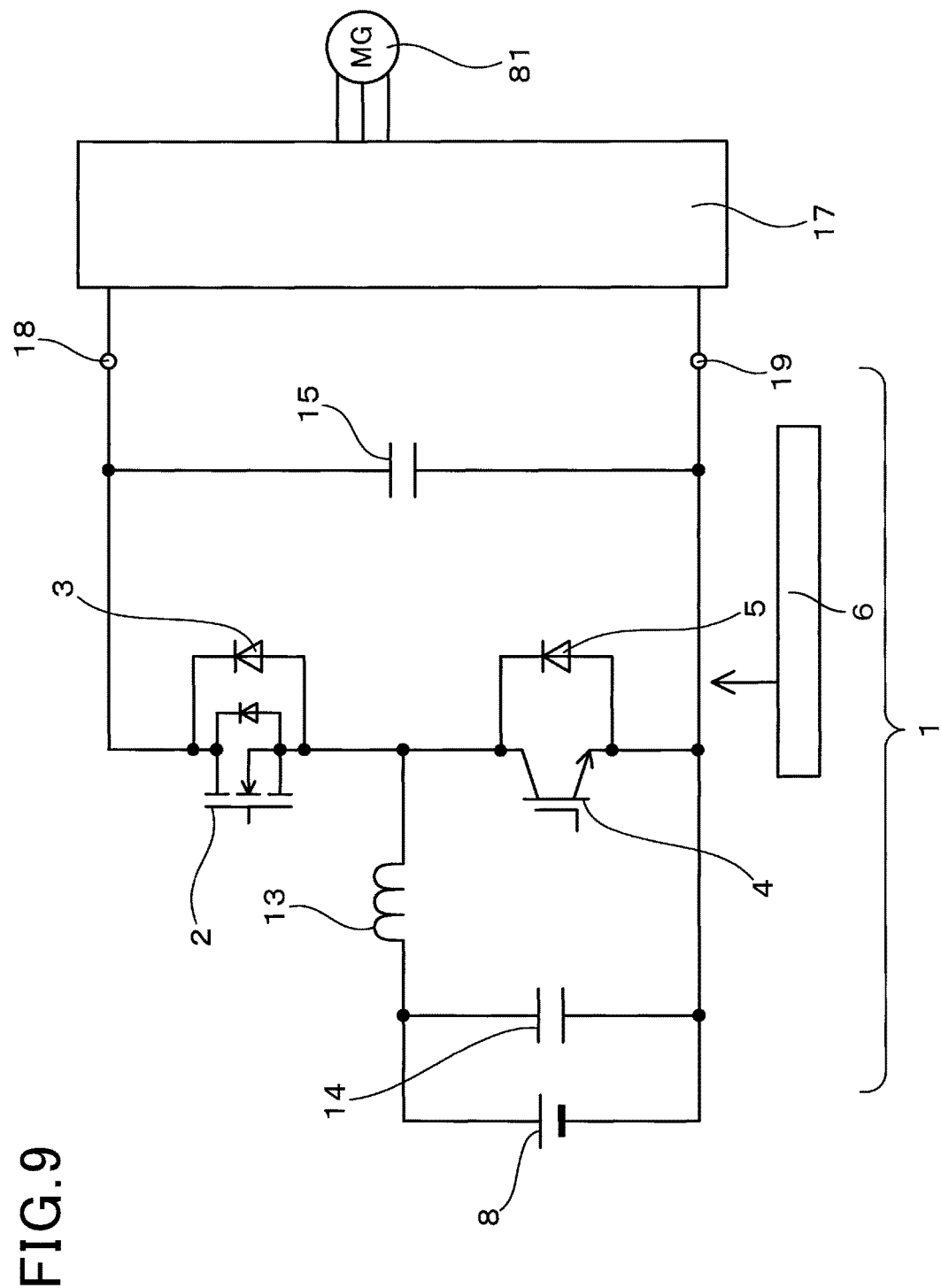
FIG. 9 is a circuit diagram of the power conversion apparatus according to the first embodiment of the invention when used together with an inverter and a three-phase AC motor.

The power conversion apparatus 1 includes output terminals 17 and 18 which are connected to the inverter 17 as shown in FIG. 9. The inverter 17 is connected to a three-phase AC motor 81. The power conversion apparatus 1 is configured to operate in the stepup discharge mode and the stepdown discharge mode. In the stepup discharge mode, the DC voltage of the DC power source 8 is stepped up and supplied to the inverter 17. The inverter 17 converts the stepped up DC voltage into AC power. This AC power is used to drive the three-phase AC motor 81 to drive the vehicle. In the stepdown discharge mode, the DC power source 8 is charged using electric power supplied from the three-phase AC motor 81.

In the stepup discharge mode, the MOSFET 2 is turned off, and the IGBT 4 is turned on as shown in FIG. 1. As a result, a current flows from the DC power source 8 to the reactor 13, and energy is stored in the reactor 13.

Figure 2:
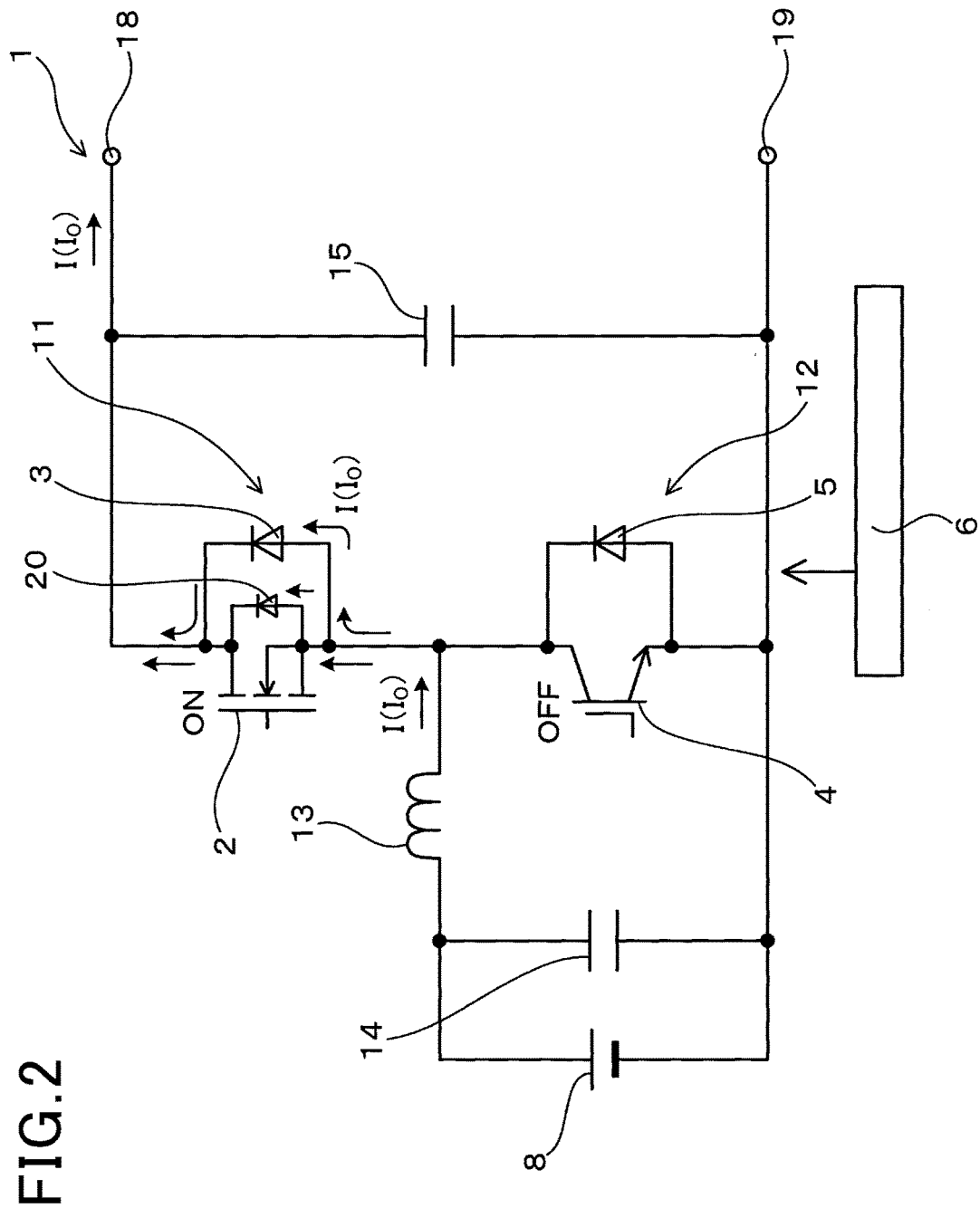
FIG. 2 is a circuit diagram of the power conversion apparatus according to the first embodiment of the invention in a state where the MOSFET of the upper arm thereof is on during the stepup discharge mode.

Thereafter, the IGBT 4 is turned on as shown in FIG. 2. As a result, the energy stored in the reactor 13 is released, causing a current I to flow from the reactor 13. The current I passes through the wide bandgap diode 3, and flows out from the output terminal 18.

The control circuit section 6 is configured to turn on the MOSFET 2 while the IGBT 4 is off. When the MOSFET 2 is turned on, the current I flows from the reactor 13 to the MOSFET 2. Since the MOSFET 2 can cause the current I to flow from the source to the drain thereof, the control as described above is possible.

Figure 3:
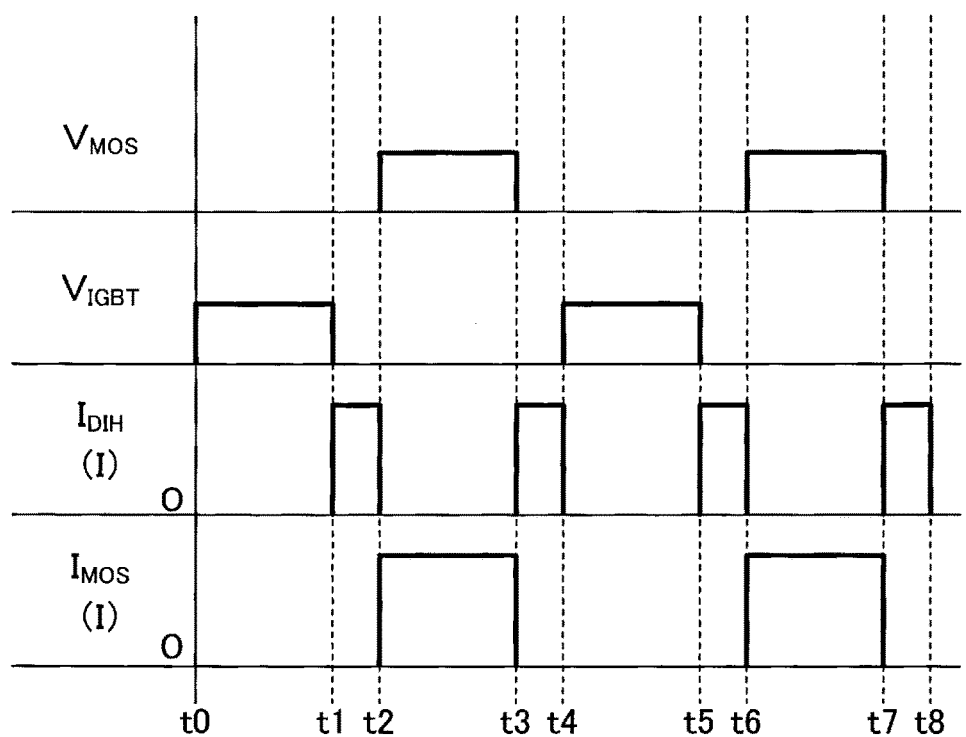
FIG. 3 is a timing diagram of the power conversion apparatus according to the first embodiment of the invention in the stepup discharge mode.

FIG. 3 is a timing diagram of the power conversion apparatus 1 in the stepup discharge mode. As shown in this diagram, the IGBT 4 turns on and off repeatedly. While the IGBT 4 is off, the MOSFET 2 turns on. For example, the IGBT 4 changes from on to off at time t1, and thereafter the MOSFET 2 turns on at time t2. Thereafter, the MOSFET 2 turns off at time t3, and when it becomes time t4 after an elapse of a predetermined time, the IGBT 4 turn on again. Such an operation is repeated.

The time period between time t1 and time t2 and the time period between time t3 and time t4 are provided as the so called dead time to prevent the MOSFET 2 and IGBT 4 from turning on at the same time. During the time period between time t1 and time t2 and the time period between time t3 and time t4, since the MOSFET 2 is not on, the current I flows mainly to the wide bandgap diode 11 from the reactor 13. A part of the current I flows to a body diode 20 formed in the MOSFET 2 (see FIG. 2).

During the time period between time t2 and time t3, since the MOSFET 2 is on, the current I flows mainly to the MOSFET 2 whose on-resistance is small.

Figure 4:
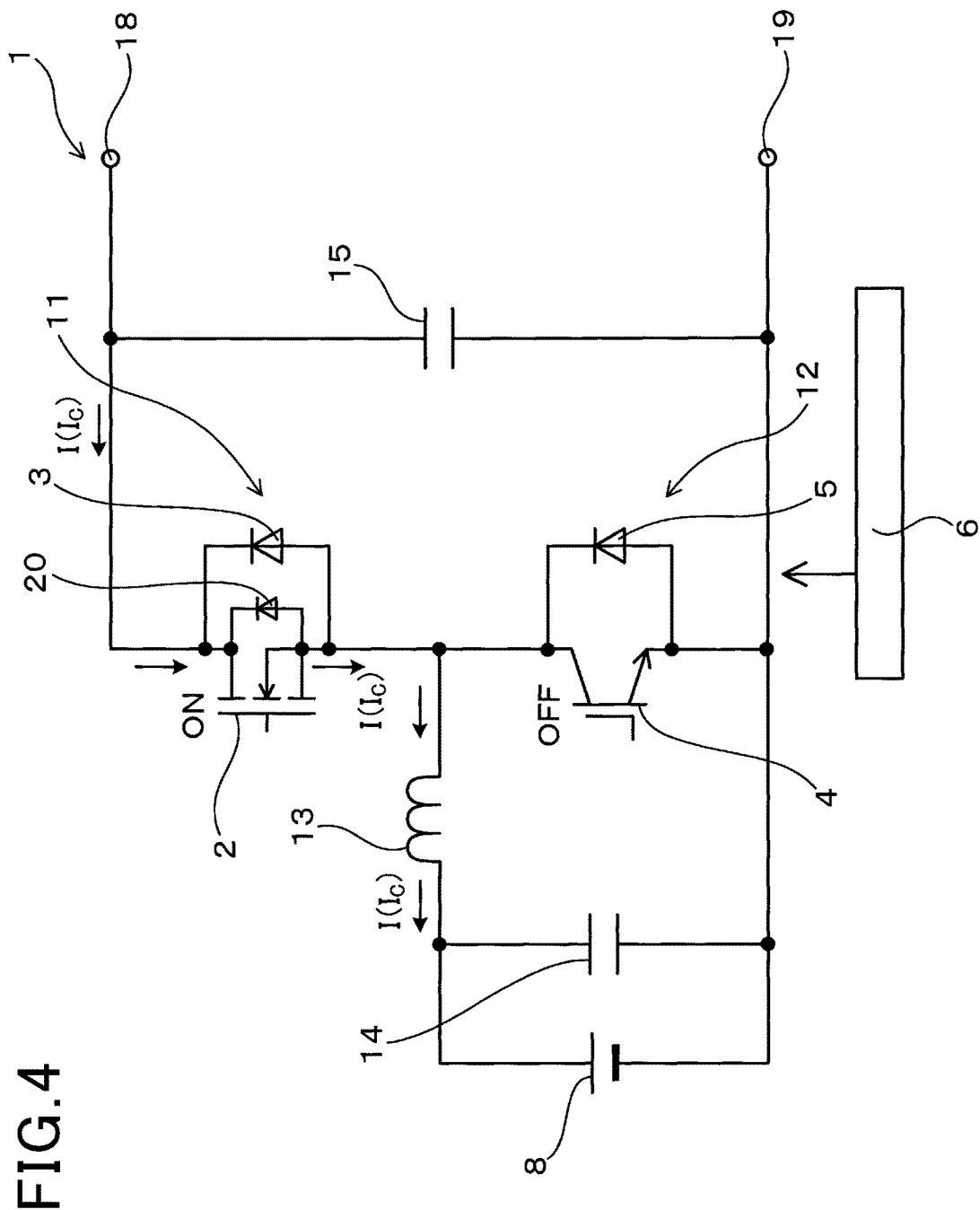
FIG. 4 is a circuit diagram of the power conversion apparatus according to the first embodiment of the invention in a state where the MOSFET of the upper arm is on during a stepdown discharge mode.
Figure 5:
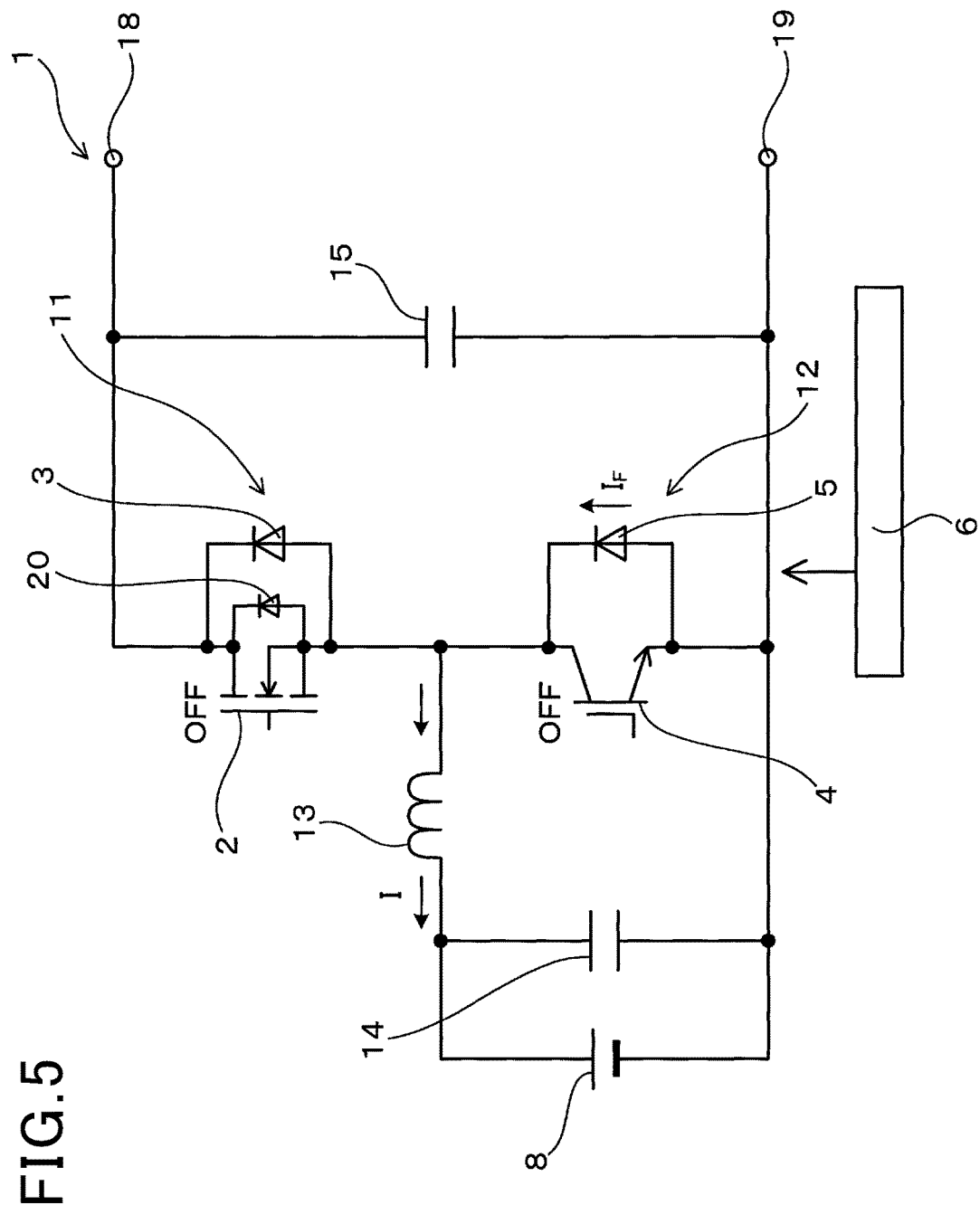
FIG. 5 is a circuit diagram of the power conversion apparatus according to the first embodiment of the invention in a state where the MOSFET of the upper arm is off during the stepdown discharge mode.

Next, the stepdown discharge mode is explained. In the stepdown discharge mode, the control circuit section 6 causes the MOSFET 2 to turn on while keeping the IGBT 4 off as shown in FIG. 4. As a result, a current flows from the load side to the reactor 13, and the reactor 13 stores energy. Thereafter, the MOSFET 2 is turned off while keeping the IGBT 4 off as shown in FIG. 5. As a result, the energy stored in the reactor 13 is released, and a current flows from the reactor 13 to the DC power source 8. Accordingly, the DC power source 8 is charged. The freewheel current $I_F$ of the reactor 13 flows through the silicone diode 5.

Figure 6:
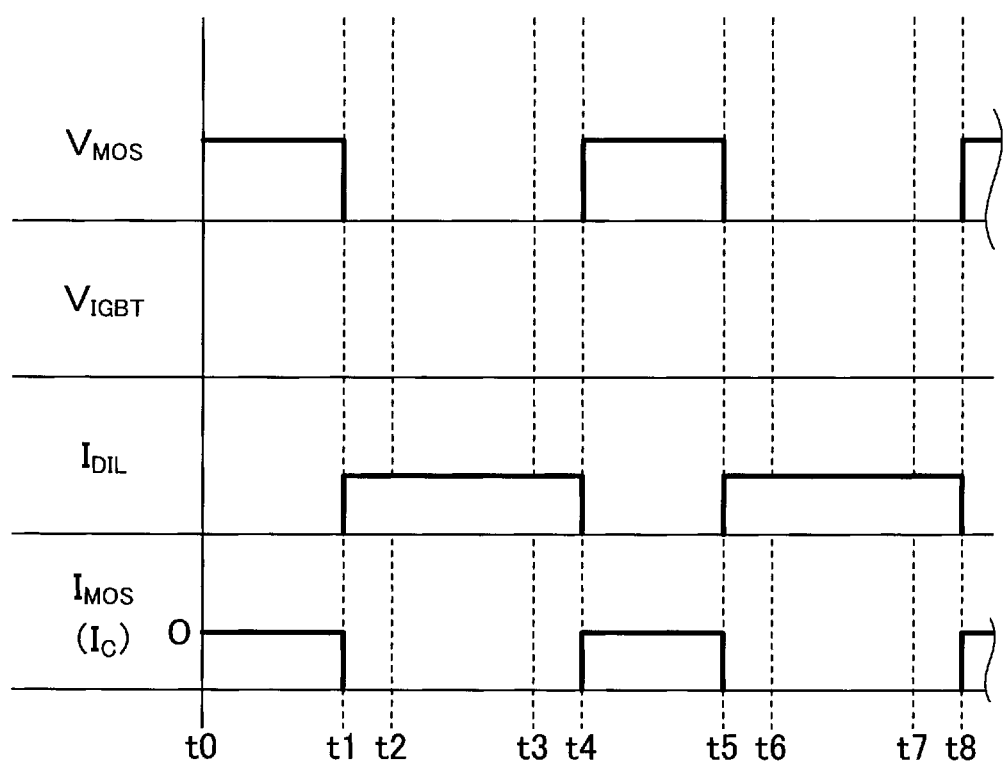
FIG. 6 is a timing diagram of the power conversion apparatus according to the first embodiment of the invention in the stepdown discharge mode.

FIG. 6 is a timing diagram of the power conversion apparatus 1 in the stepdown discharge mode. As shown in this diagram, the MOSFET 2 turns on and off repeatedly while the IGBT 4 is kept off. While the MOSFET 2 is on, a current flows through the MOSFET 2. While the MOSFET 2 is off, a current flow through the silicone diode 5.

The control circuit section 6 is configured to operate in a non-stepup discharge mode in which the DC voltage of the DC power source 8 is outputted without being stepped up. The control circuit section 6 operates in the non-stepup discharge mode in a case where the three-phase AC motor 81 can be driven by directly converting the DC power from the DC power source 8 into AC power using the inverter 17 (see FIG. 9), for example.

Figure 7:
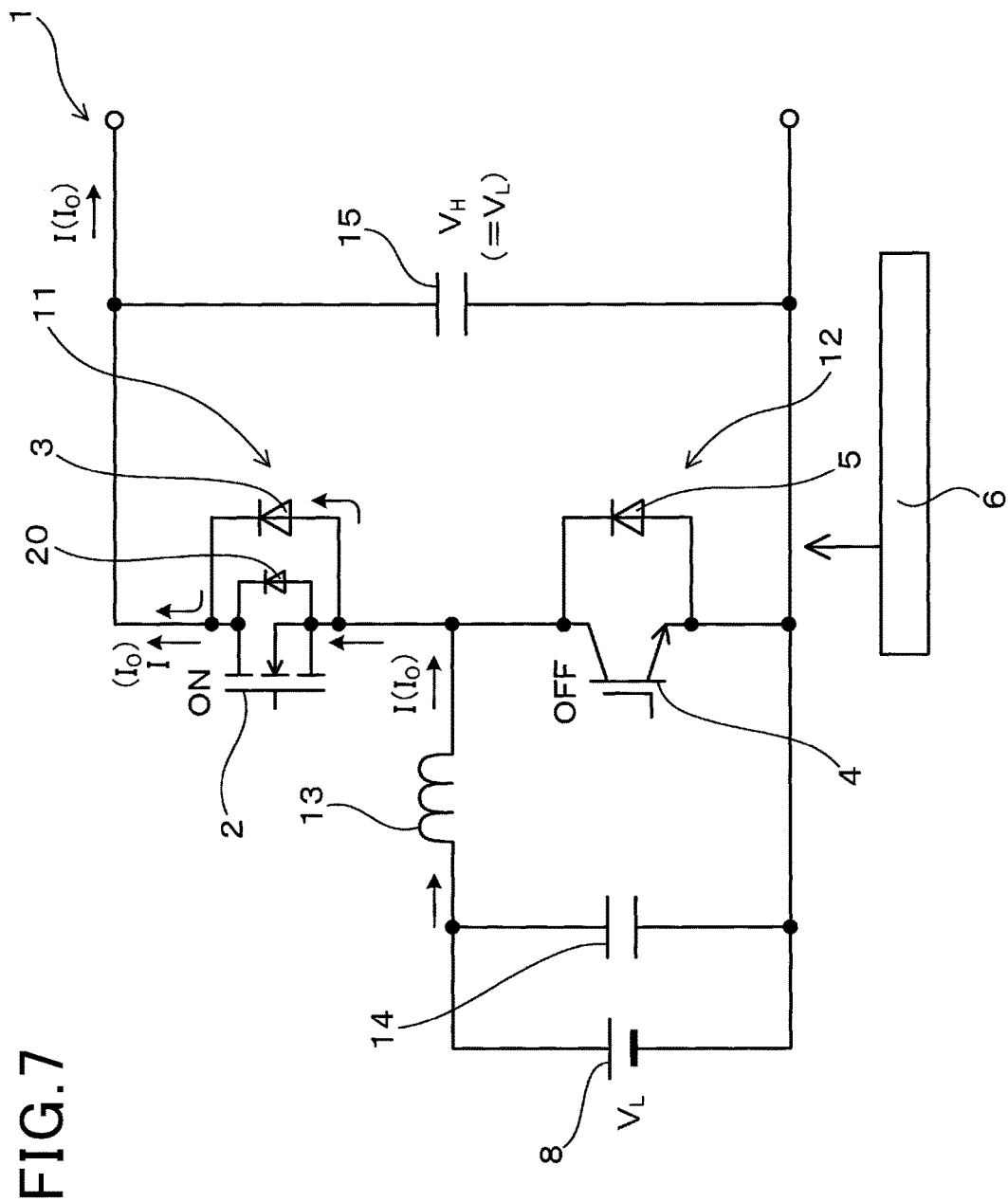
FIG. 7 is a circuit diagram of the power conversion apparatus according to the first embodiment of the invention in a non-stepup (passthrough) discharge mode.

As shown in FIG. 7, in the non-stepup discharge mode, the IGBT 4 is kept off and the MOSFET 2 is kept on. As a result, the current I from the DC power source 8 passes through the reactor 13, flows mainly through the MOSFET 2 and is outputted. A part of the current I flows to the wide bandgap diode 3. The DC voltage is not stepped up in the non-stepup discharge mode because the IGBT 4 is kept off.

Figure 8:
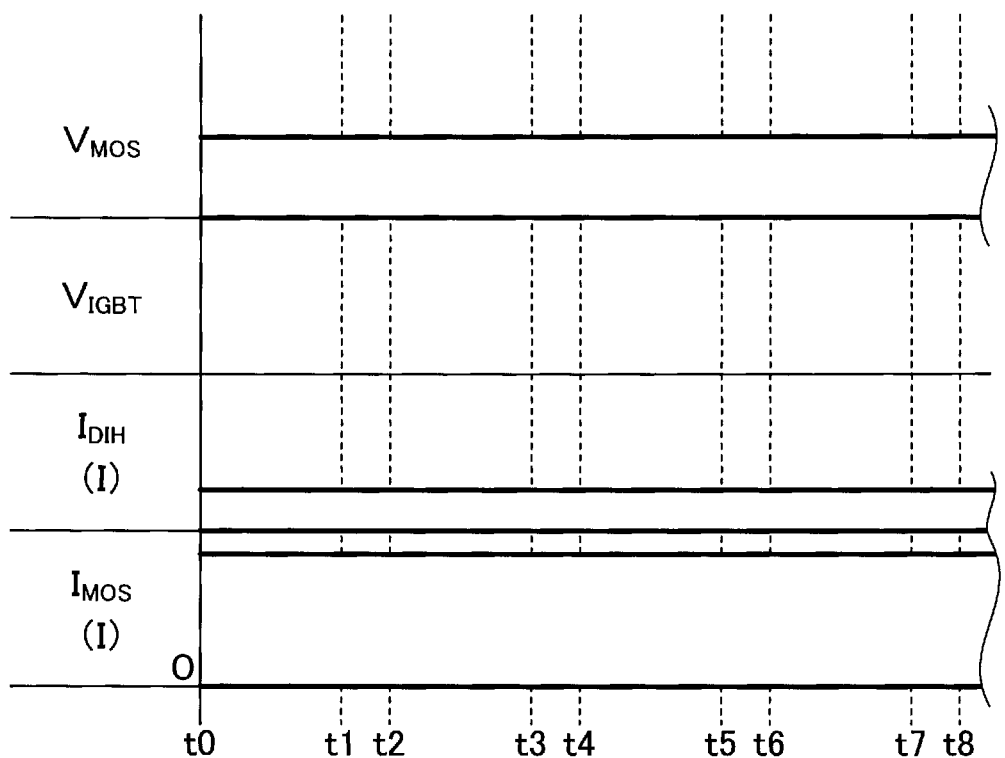
FIG. 8 is a timing diagram of the power conversion apparatus according to the first embodiment of the invention in the non-stepup discharge mode.

FIG. 8 is a timing diagram of the power conversion apparatus 1 in the non-stepup discharge mode. As shown in FIG. 7, in the non-stepup discharge mode, the IGBT 4 is kept off and the MOSFET 2 is kept on. A constant current IMOS continues to flow through the MOSFET 2. A part of the current IMOS flows through the wide bandgap diode 3 which is reverse parallel-connected to the MOSFET 2.

The first embodiment described above provides the following advantages. As shown in FIG. 1, the first semiconductor pair 11 is comprised of the MOSFET 2 made of wide bandgap semiconductor material and the wide bandgap diode 3 which is reverse parallel-connected to the MOSFET 2. The second semiconductor pair 12 is comprised of the IGBT 4 made of silicon semiconductor material and the silicone diode 5 which is reverse parallel-connected to the IGBT 4. The first and second semiconductor pairs 11 and 12 are connected in series to each other. Accordingly, since not all of the elements are need to be made of expensive wide bandgap semiconductor material, some of the elements can be made of inexpensive silicon semiconductor material to reduce the manufacturing cost of the power conversion apparatus 1.

The MOSFET 2 is made of wide bandgap semiconductor material. Accordingly, since there is no diffusion potential in the MOSFET 2, the on-resistance of the MOSFET 2 is small. Therefore, by using the MOSFET 2, the switching loss of the power conversion apparatus 1 can be reduced.

A Schottky barrier diode is used as the wide bandgap diode 3. No recovery current flows through a Schottky barrier diode. Accordingly, the recovery loss can be reduced by using a Schottky barrier diode as the wide bandgap diode 3. Further, when a current flows through the MOSFET 2 in the reverse direction, it can be divided into a current that flows through the body diode 20 of the MOSFET 2 and a current that flows through the wide bandgap diode 3. Accordingly, since it is possible to prevent a large current from flowing through the body diode 20 of the MOSFET 2, the MOSFET 2 can be made small in size. Therefore, the manufacturing cost of the power conversion apparatus 1 can be reduced.

As shown in FIGS. 1 and 2, the first semiconductor element pair 11 is disposed in the upper arm, and the second semiconductor element pair 12 is disposed in the lower arm. The DC voltage of the DC power source 8 is stepped up by causing the IGBT 4 of the second semiconductor element pair 12 to perform switching. Therefore, since an output current $I_O$ can be passed to the wide bandgap diode 3 having a low resistance compared to the silicon diode for a long time period when the stepup ratio is low and the conduction time of the upper arm is long in the stepup discharge mode, the loss in the stepup discharge mode can be reduced. If the second semiconductor element pair 12 is disposed in the upper arm (see FIG. 15), that is, if the silicone diode 5 is disposed in the upper arm, since the output current $I_O$ has to pass through the silicone diode 5 having a high resistance, the loss in the stepup discharge mode becomes large when the stepup ratio is low.

As shown in FIGS. 2 and 3, the MOSFET 2 is turned on during a period in which the IGBT 4 is off in the stepup discharge mode. Accordingly, since the output current $I_O$ can be passed to the MOSFET 2, it is possible to reduce the output current $I_O$ flowing through the wide bandgap diode 3. Hence, according to this embodiment, it is possible to reduce the size of the expensive wide bandgap diode 3 to thereby reduce the manufacturing cost of the power conversion apparatus 1.

As shown in FIGS. 7 and 8, the IGBT 4 is caused to stop switching, and the MOSFET 2 is caused to continue to be on in the non-stepup discharge mode. Accordingly, since the output current $I_O$ can be passed to the MOSFET 2, it is possible to reduce the output current $I_O$ flowing through the wide bandgap diode 3 in the non-stepup discharge mode. Hence, according to this embodiment, it is possible to reduce the size of the expensive wide bandgap diode 3 to thereby reduce the manufacturing cost of the power conversion apparatus 1.

It should be noted that although the MOSFET 2 and the wide bandgap diode 3 are made of SiC in the first embodiment, they may be made of GaN or diamond.

Second Embodiment

Figure 10:
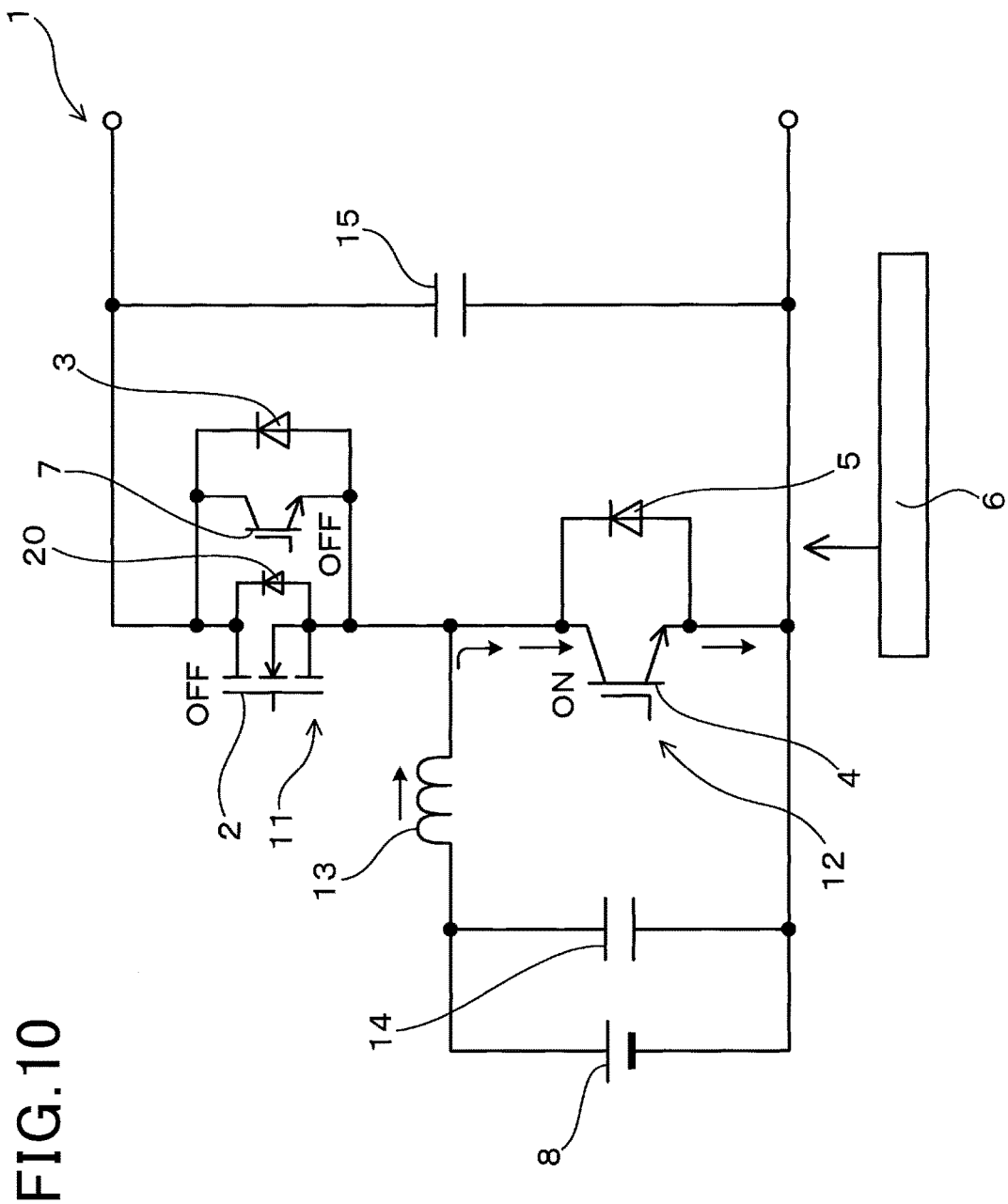
FIG. 10 is a circuit diagram of a power conversion apparatus according to a second embodiment of the invention in a state where the IGBT of the lower arm thereof is on during the stepup discharge mode.

Next, a second embodiment of the invention is described. As shown in FIG. 10, in the second embodiment, an auxiliary switching element 7 is parallel-connected to the MOSFET 2. The auxiliary switching element 7 is a bipolar type transistor made of silicon semiconductor material. Here, the bipolar type transistor is a bipolar transistor or an IGBT.

Figure 11:
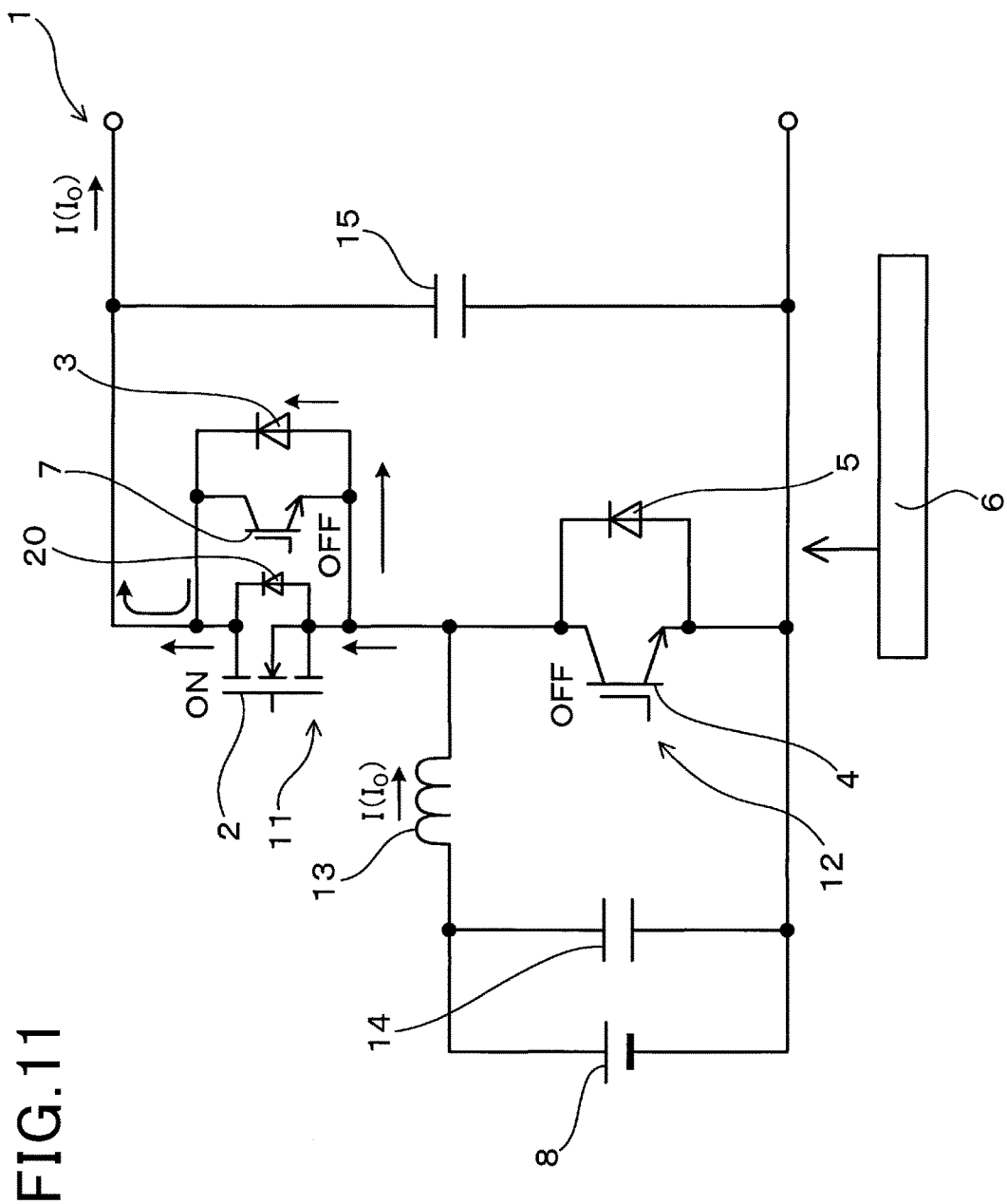
FIG. 11 is a circuit diagram of the power conversion apparatus according to the second embodiment of the invention in a state where the MOSFET of the upper arm thereof is on during the stepup discharge mode.

In the power conversion apparatus 1 of this embodiment, the IGBT 4 is caused to perform switching in the stepup discharge mode as shown in FIGS. 10 and 11. During a period in which the IGBT 4 is on (see FIG. 10), the MOSFET 2 is kept off. During a period in which the IGBT 4 is off (see FIG. 11), the MOSFET 2 is kept on. Since no current flows from the emitter to the collector of the auxiliary switching element 7, the auxiliary switching element 7 is turned off when the MOSFET 2 is turned on. Alternatively, the auxiliary switching element 7 may be turned on at that moment.

As shown in FIG. 11, when the IGBT 4 is turned off and the MOSFET 2 is turned on, the current I from the reactor 13 flows through mainly the MOSFET 2. A part of the current I flows through also the wide bandgap diode 3.

Figure 12:
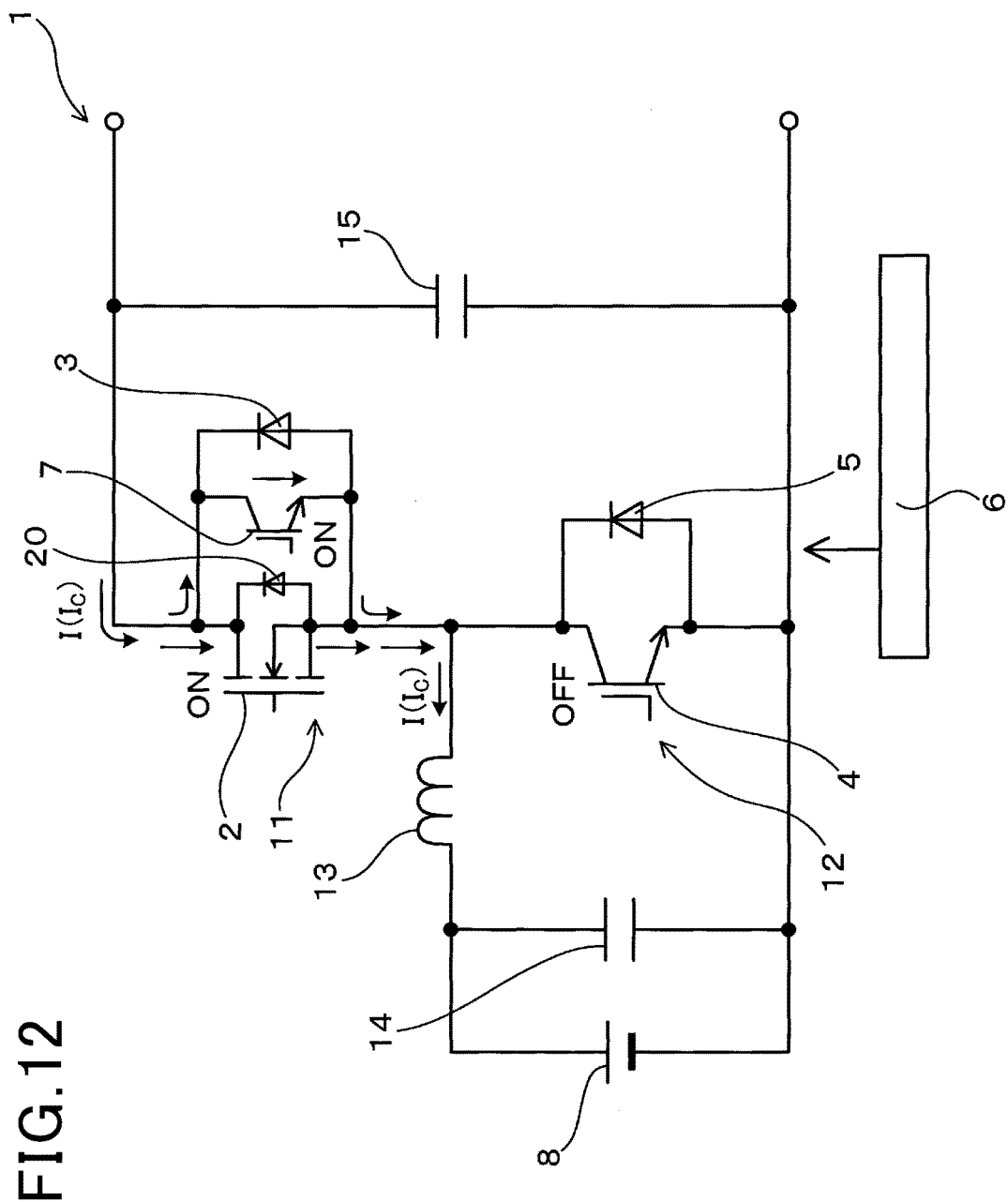
FIG. 12 is a circuit diagram of the power conversion apparatus according to the second embodiment of the invention in the stepdown discharge mode.

As shown in FIG. 12, the MOSFET 2 and the auxiliary switching element 7 are caused to operate switching at the same time in the stepdown discharge mode. Accordingly, since it is possible to pass current to both the MOSFET 2 and the auxiliary switching element 7, a charge current $I_C$ can be increased. In addition, since current can be passed to the auxiliary switching element 7, it is possible to reduce the current passing through the MOSFET 2. This makes it possible to downsize the MOSFET 2 to reduce the manufacturing cost of the power conversion apparatus. The second embodiment is the same in structure and advantages as the first embodiment except for the above.

In this embodiment, the auxiliary switching element 7 is made of silicon semiconductor material. However, it may be made of wide bandgap semiconductor material.

Third Embodiment

Figure 13:
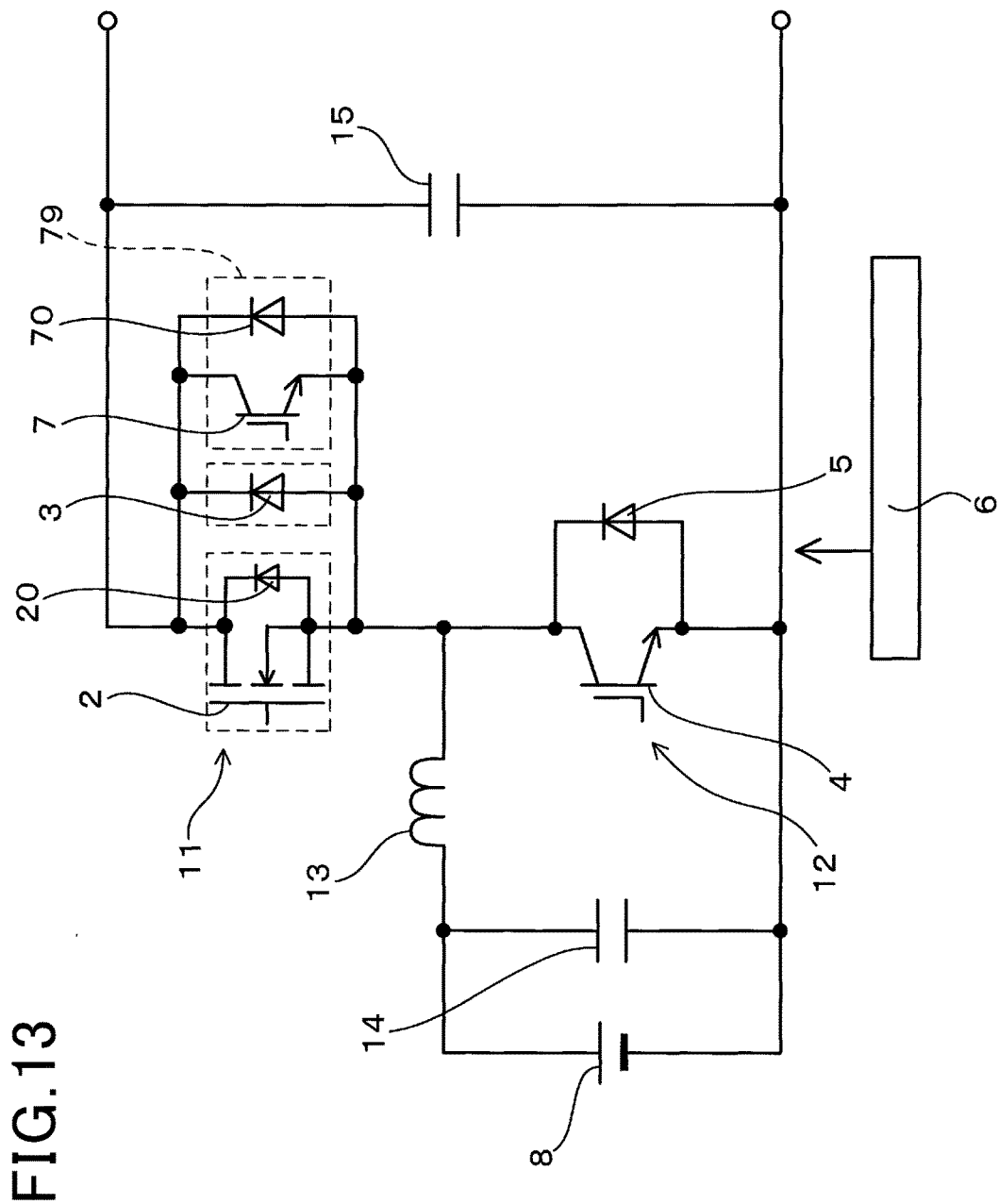
FIG. 13 is a circuit diagram of a power conversion apparatus according to a third embodiment of the invention.
Figure 14:
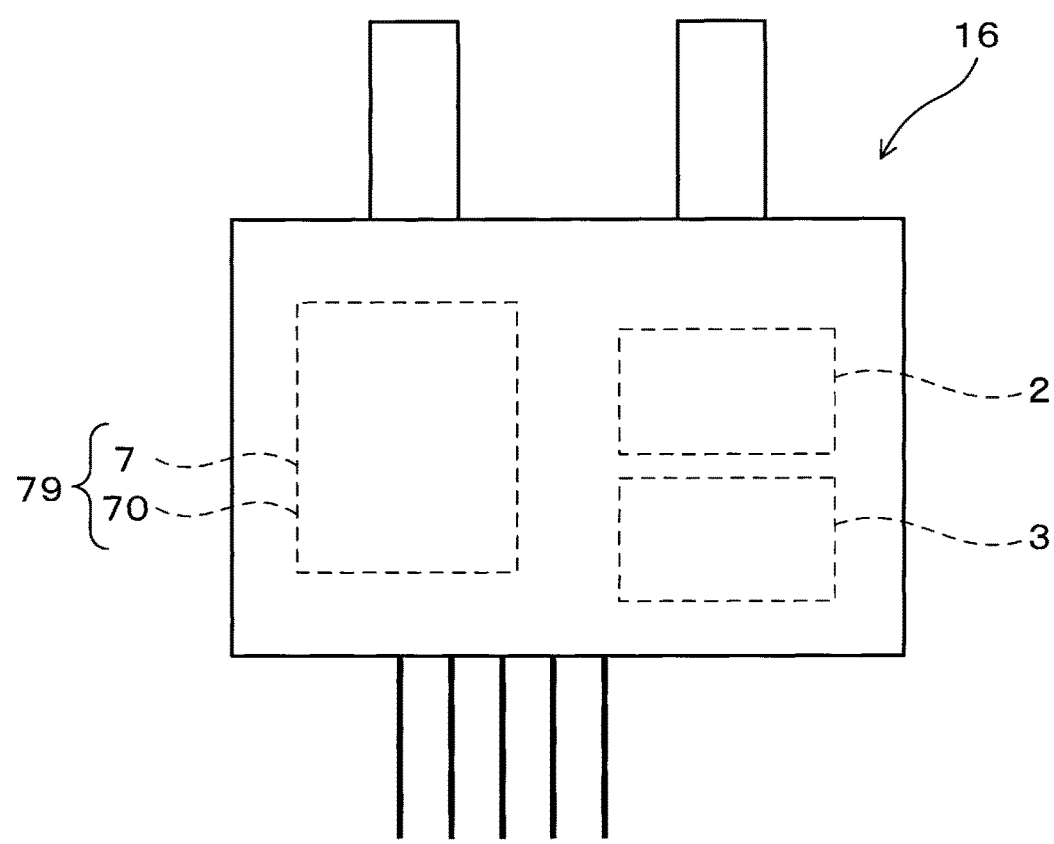
FIG. 14 is a partial perspective view of a semiconductor module of the power conversion apparatus according to the third embodiment of the invention.

Next, a third embodiment of the invention is described. As shown in FIG. 13, in this embodiment, the auxiliary switching element 7 is reverse parallel-connected with a freewheel diode 70. The diode 70 and the auxiliary switching element 7 are formed in a single semiconductor chip 79. As shown in FIG. 14, the semiconductor chip 79, the MOSFET 2 and the wide bandgap diode 3 constitute a semiconductor module 16. The third embodiment is the same in structure and advantages as the second embodiment except for the above.

Fourth Embodiment

Figure 15:
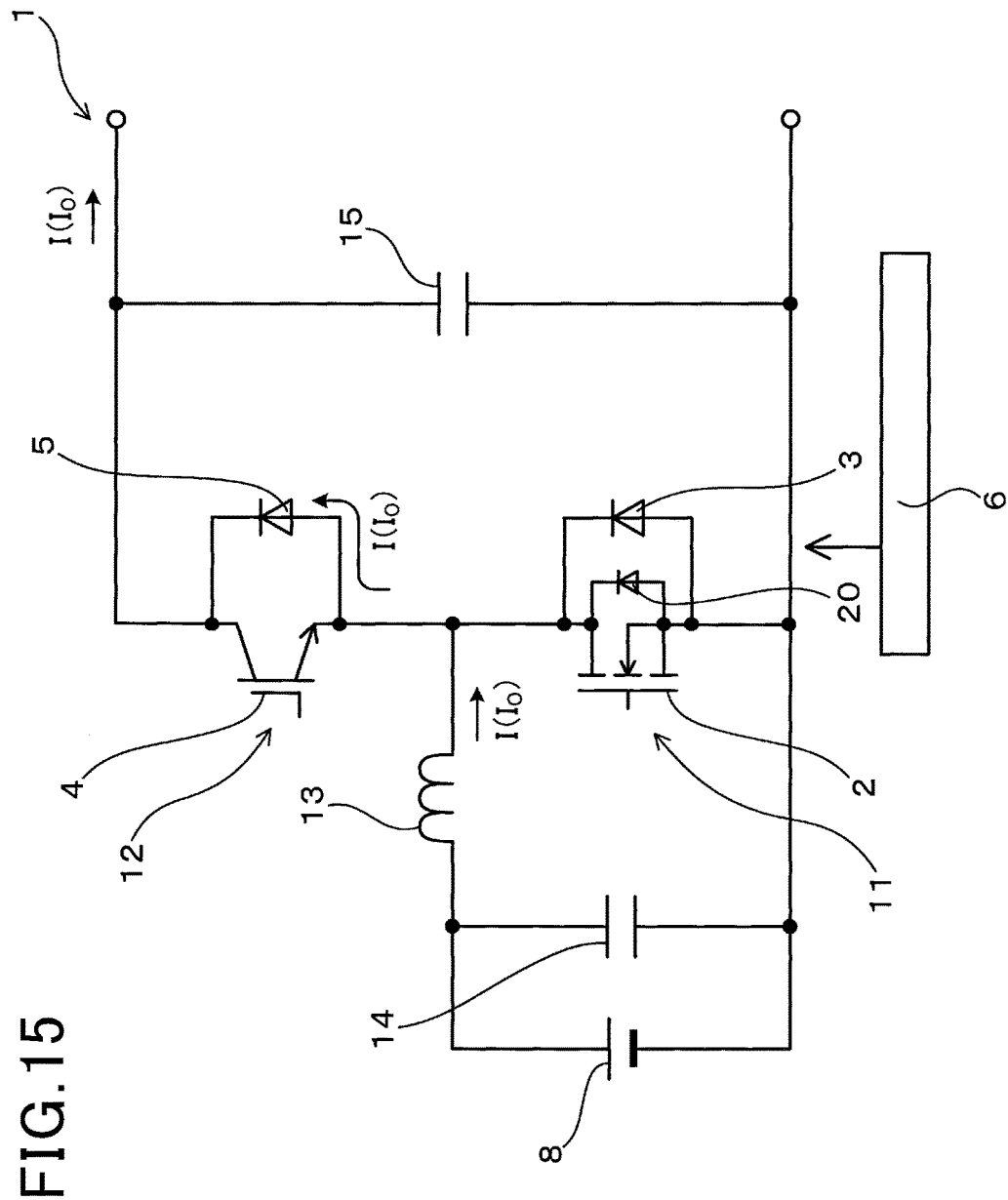
FIG. 15 is a circuit diagram of a power conversion apparatus according to a fourth embodiment of the invention.

Next, a fourth embodiment of the invention is described. As shown in FIG. 15, in this embodiment, the first semiconductor element pair 11 is disposed in the lower arm, and the second semiconductor element pair 12 is disposed in the upper arm. The fourth embodiment is the same in structure and advantages as the first embodiment except for the above.

Fifth Embodiment

Figure 16:
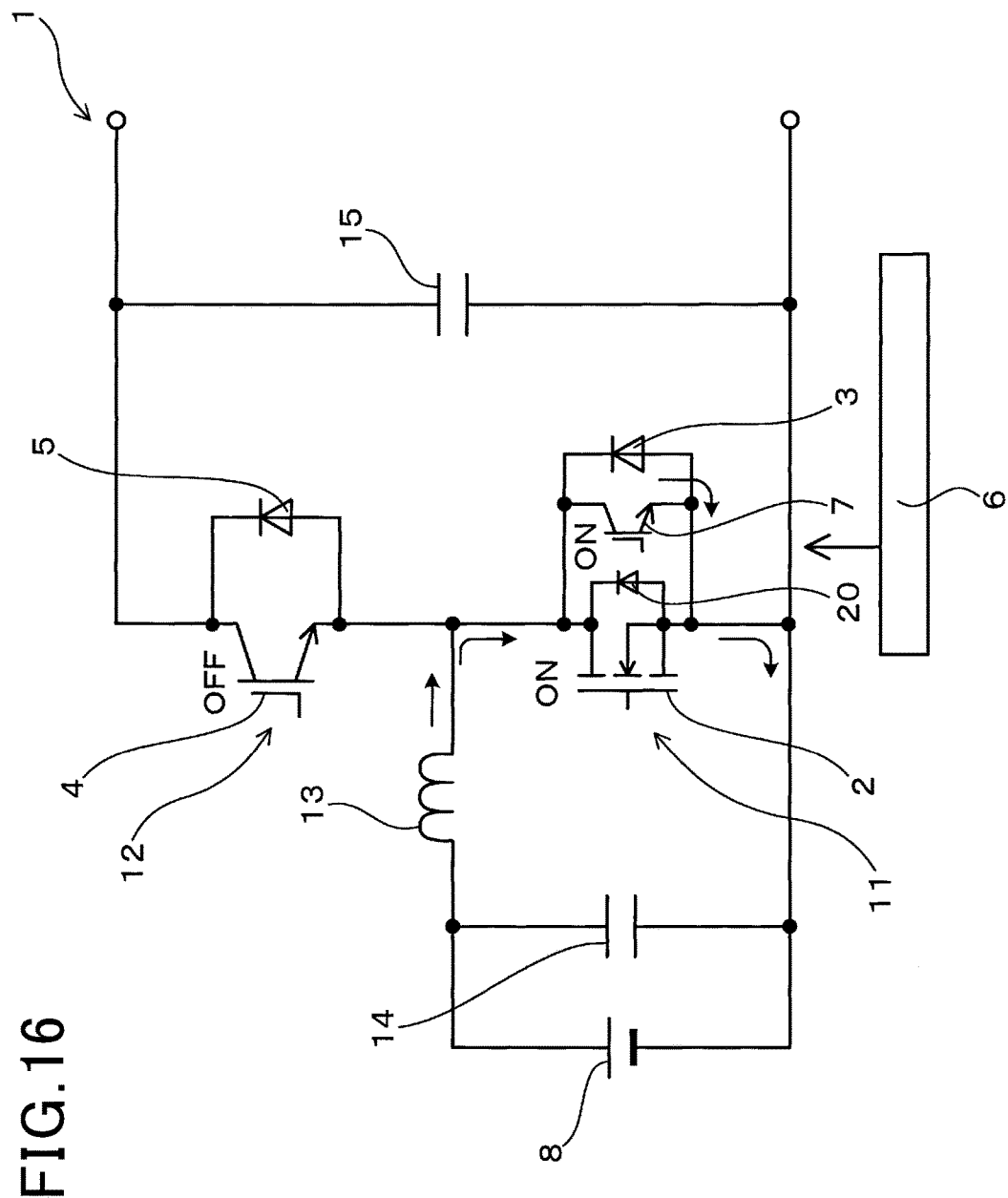
FIG. 16 is a circuit diagram of a power conversion apparatus according to a fifth embodiment of the invention in a state where the MOSFET and auxiliary switching element thereof are on during the stepup discharge mode.

As shown in FIG. 16, in this embodiment, the first semiconductor element pair 11 is disposed in the lower arm, and the auxiliary switching element 7 is parallel-connected to the MOSFET 2. The auxiliary switching element 7 is an IGBT.

Figure 17:
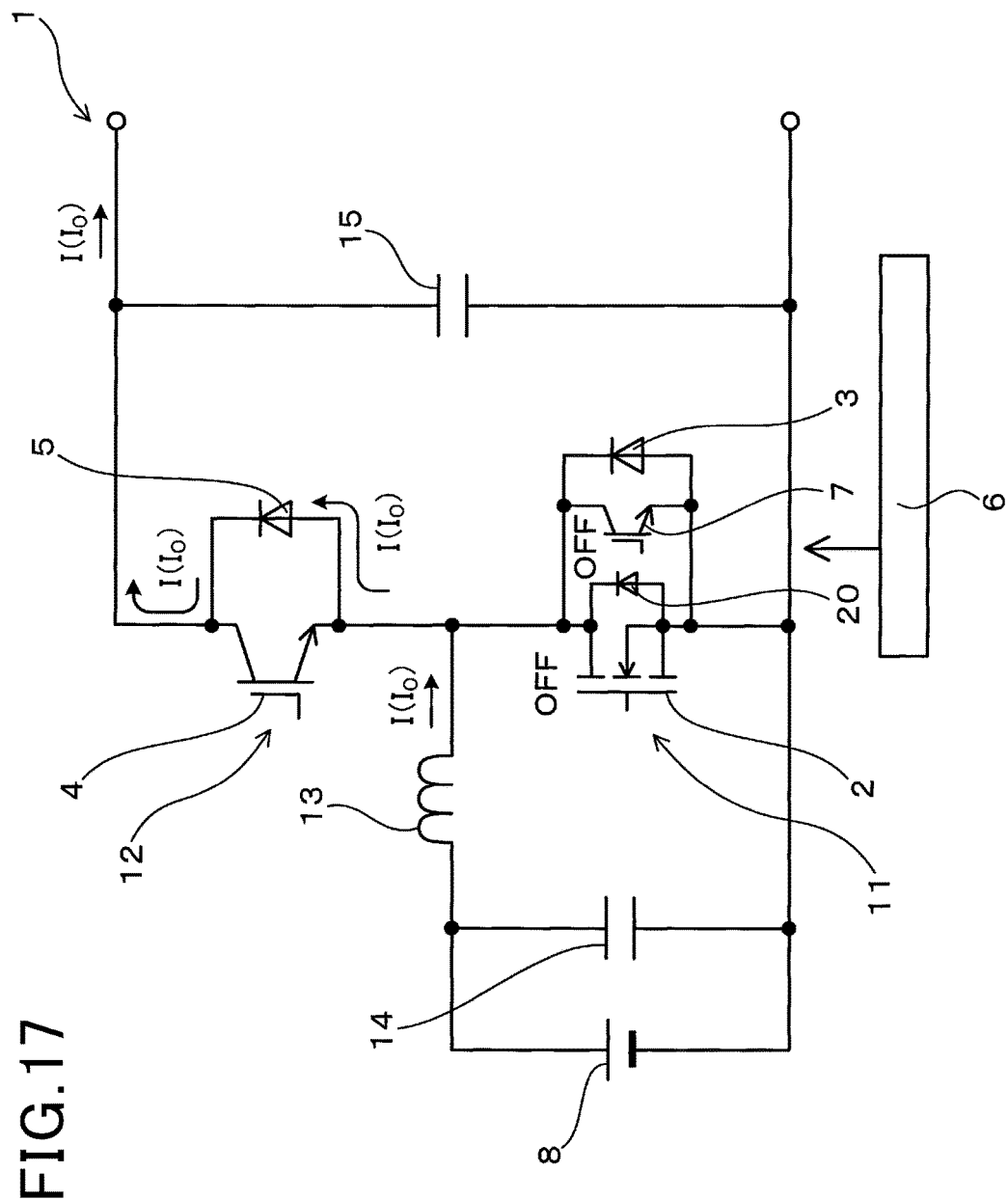
FIG. 17 is a circuit diagram of the power conversion apparatus according to the fifth embodiment of the invention in a state where the MOSFET and auxiliary switching element are off during the stepup discharge mode.

In this embodiment, when the value of the output current $I_O$ is larger than a predetermined value, both the MOSFET 2 and the auxiliary switching element 7 are caused to switch, so that the current is passed to both the MOSFET 2 and the auxiliary switching element 7 as shown in FIGS. 16 and 17. As a result, it is possible to increase the output current $I_O$ compared to the case where the MOSFET 2 is used alone.

Figure 18:
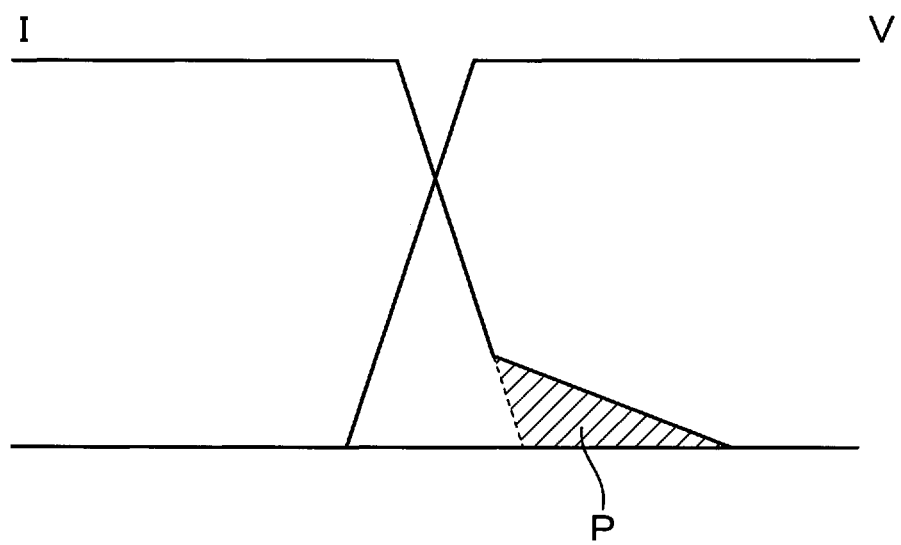
FIG. 18 is a waveform diagram of current and voltage when the IGBT of the power conversion apparatus according to the fifth embodiment of the invention is turned off.

On the other hand, when the value of the output current $I_O$ is smaller than the predetermined value, only the MOSFET 2 is caused to operate switching for the purpose of reducing the switching loss. As shown in FIG. 18, when the IGBT is turned off, there may be a case in which the current I does not decrease rapidly but decreases only gradually. In this case, there occurs an additional loss P during a period in which the current I decreases gradually. When the output current $I_O$ is smaller, the ratio of the loss P in the whole loss becomes larger.

Figure 19:
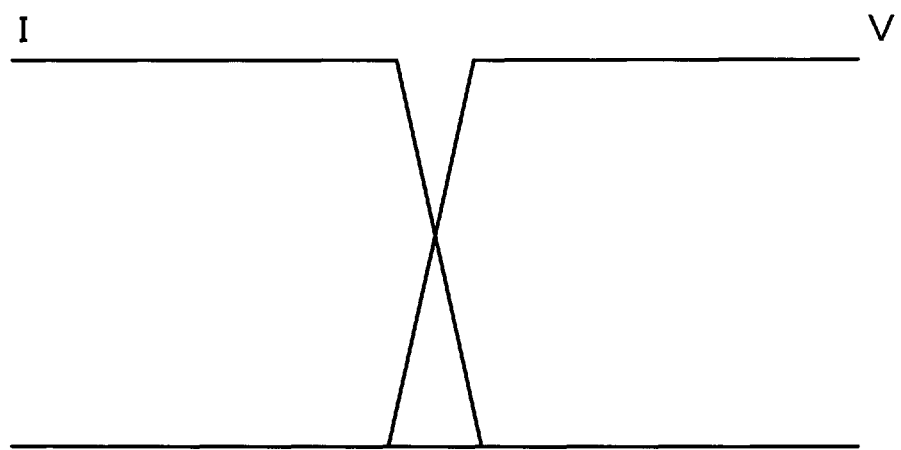
FIG. 19 is a waveform diagram of current and voltage when the MOSFET of the power conversion apparatus according to the fifth embodiment of the invention is turned off.

According to this embodiment, as shown in FIG. 19, the current I decreases rapidly after the MOSFET 2 is turned off. Accordingly, the loss P can be reduced by causing the MOSFET 2 to perform switching when the output current $I_O$ is small. The fifth embodiment is the same in structure and advantages as the first embodiment except for the above.

Sixth Embodiment

Figure 20:
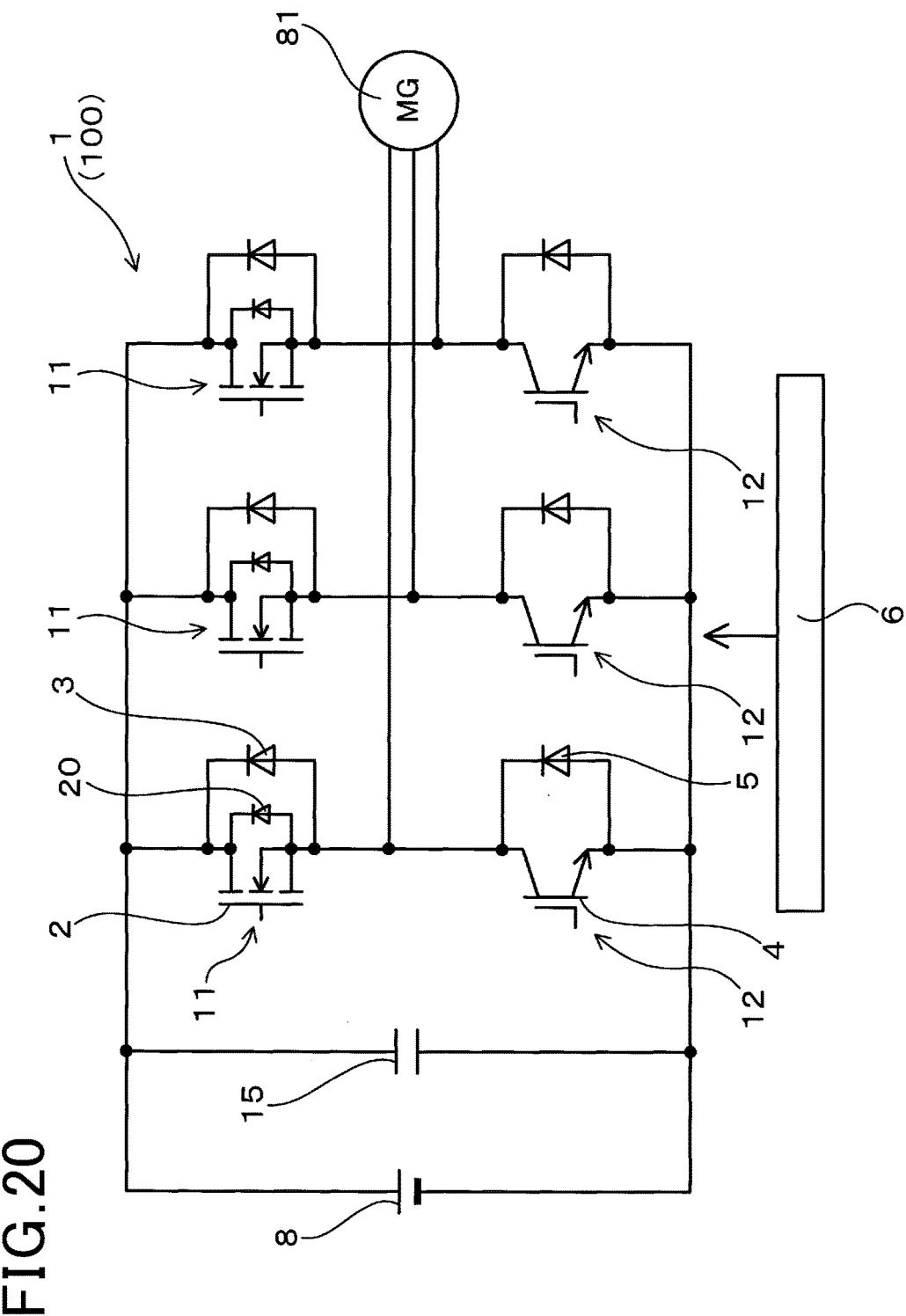
FIG. 20 is a circuit diagram of a power conversion apparatus according to a sixth embodiment of the invention.

Next, a sixth embodiment of the invention is described. As shown in FIG. 20, in this embodiment, a plurality of the first semiconductor element pairs 11 and a plurality of the second semiconductor element pairs 12 constitute an inverter circuit 100. This inverter circuit 100 converts the DC voltage supplied from the DC power source 8 into AC power to drive the three-phase AC motor 81.

When the power conversion apparatus 1 is in operation, a freewheel current flows through the upper arm when the IGBT 4 of the lower arm is turned off. In this embodiment, the control circuit section 6 is configured to turn on the MOSFET 2 during a period in which a freewheel current occurs to pass this freewheel current to the MOSFET 2. Accordingly, the freewheel current flowing through the wide bandgap diode 3 can be reduced. Hence, according to this embodiment, it is possible to reduce the size of the expensive wide bandgap diode 3 to thereby reduce the manufacturing cost of the power conversion apparatus 1. The sixth embodiment is the same in structure and advantages as the first embodiment except for the above.

Seventh Embodiment

Next, a seventh embodiment of the invention is described. In this embodiment, as shown FIGS. 21 and 22, the first semiconductor element pair 11 is disposed in the lower arm, the second semiconductor element pair 12 is disposed in the upper arm. This embodiment is configured to operate in the stepdown discharge mode. In the stepdown discharge mode, a period in which the IGBT 4 of the upper arm is on and the MOSFET 2 of the lower arm is off (see FIG. 21) and a period in which the IGBT 4 of the upper arm is off and the MOSFET 2 of the lower arm is on (see FIG. 22) are repeated alternately.

Figure 21:
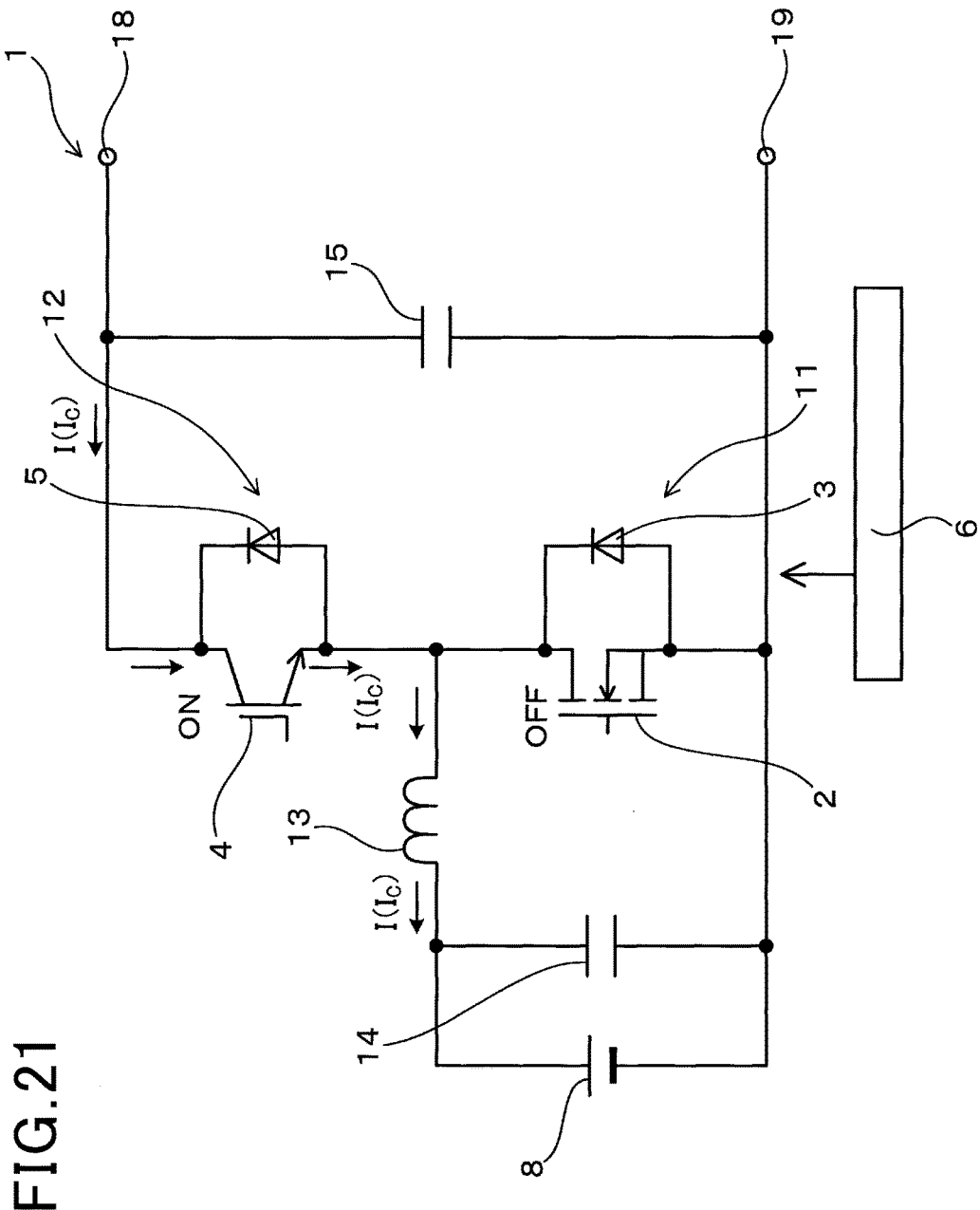
FIG. 21 is a circuit diagram of a power conversion apparatus according to a seventh embodiment of the invention in a state where the IGBT of the upper arm thereof is on during the stepdown discharge mode.
Figure 22:
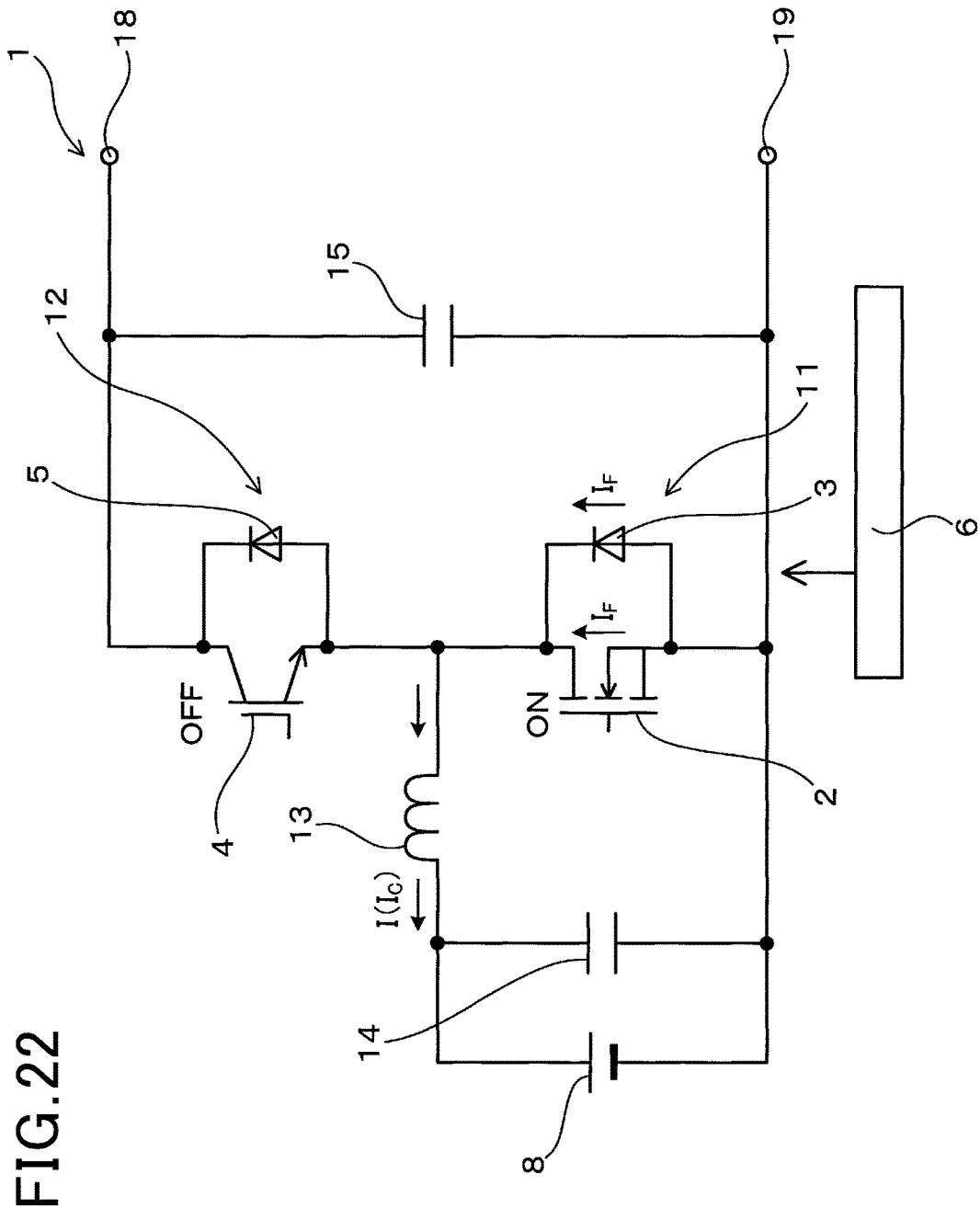
FIG. 22 is a circuit diagram of the power conversion apparatus according to the seventh embodiment of the invention in a state where the MOSFET of the lower arm thereof is on during the stepdown discharge mode.

As shown in FIG. 21, when the IGBT 4 is turned on, a current I flows from the load, and energy is stored in the reactor 13. On the other hand, when the IGBT 4 is turned off, the energy stored in the reactor 13 is released, and as a result a current I flows. The DC power source 8 is charged by this current I. As this time, the MOSFET 2 is turned on as described above. Accordingly, the freewheel current $I_F$ of the reactor 13 flows through the wide bandgap semiconductor 3 and the MOSFET 2. Hence, the freewheel $I_F$ can be increased to reduce the loss. The seventh embodiment is the same in structure and advantages as the first embodiment except for the above.

Eighth Embodiment

Figure 23:
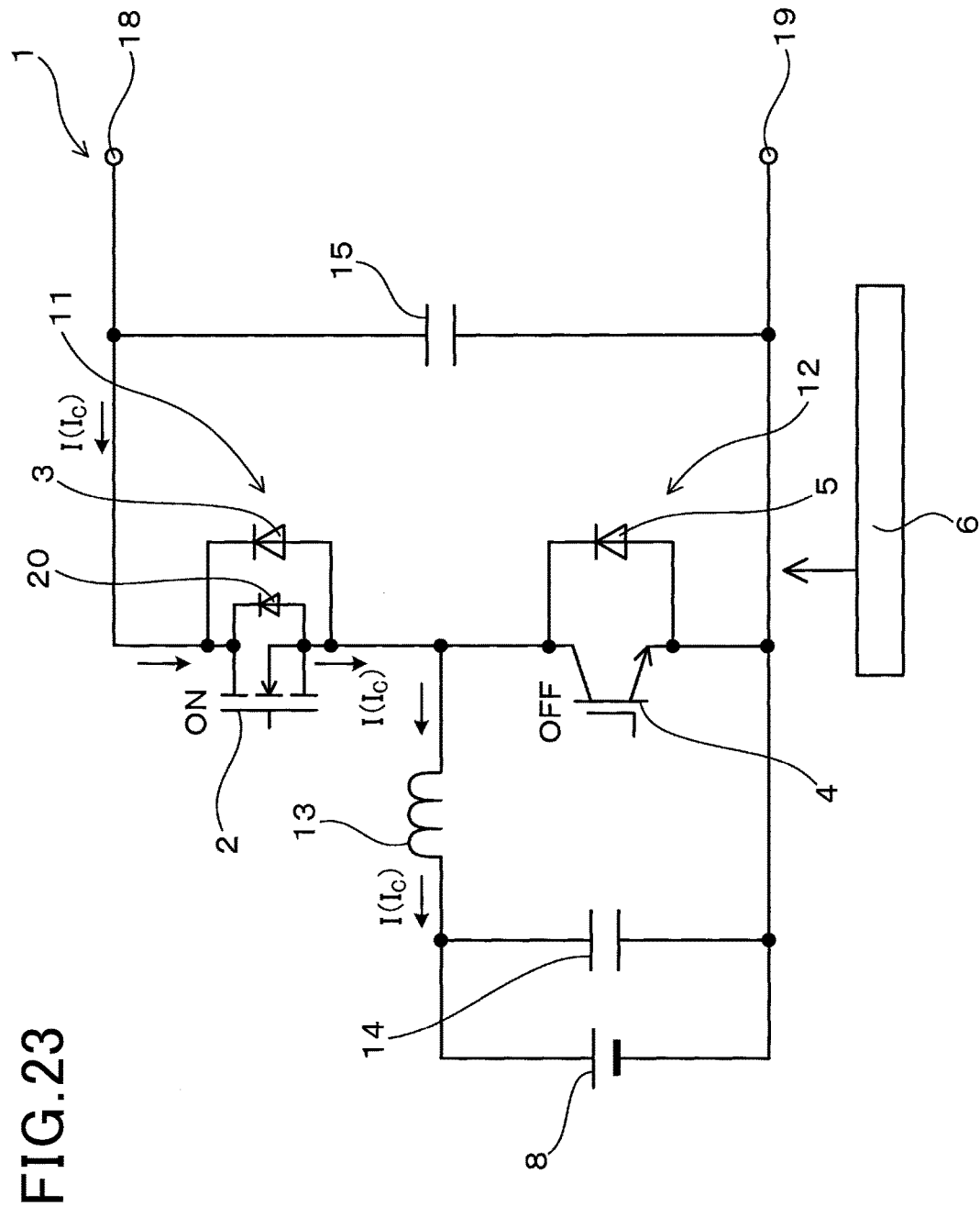
FIG. 23 is a circuit diagram of a power conversion apparatus according to an eighth embodiment of the invention in a state where the MOSFET of the upper arm thereof is kept on during a non-stepdown discharge mode.

Next, an eighth embodiment of the invention is described. This embodiment is configured to operate in a non-stepdown discharge mode to charge the DC power source 8 by DC power supplied from the load without stepping down the voltage. As shown in FIG. 23, in the non-stepdown discharge mode, the control circuit section 6 turns off the IGBT 4 of the lower arm, while keeping the MOSFET 2 of the upper arm on. As a result, the current I (the charge current $I_C$) flows from the load to the DC power source 8 through the MOSFET 2 to charge the DC power source.

Figure 24:
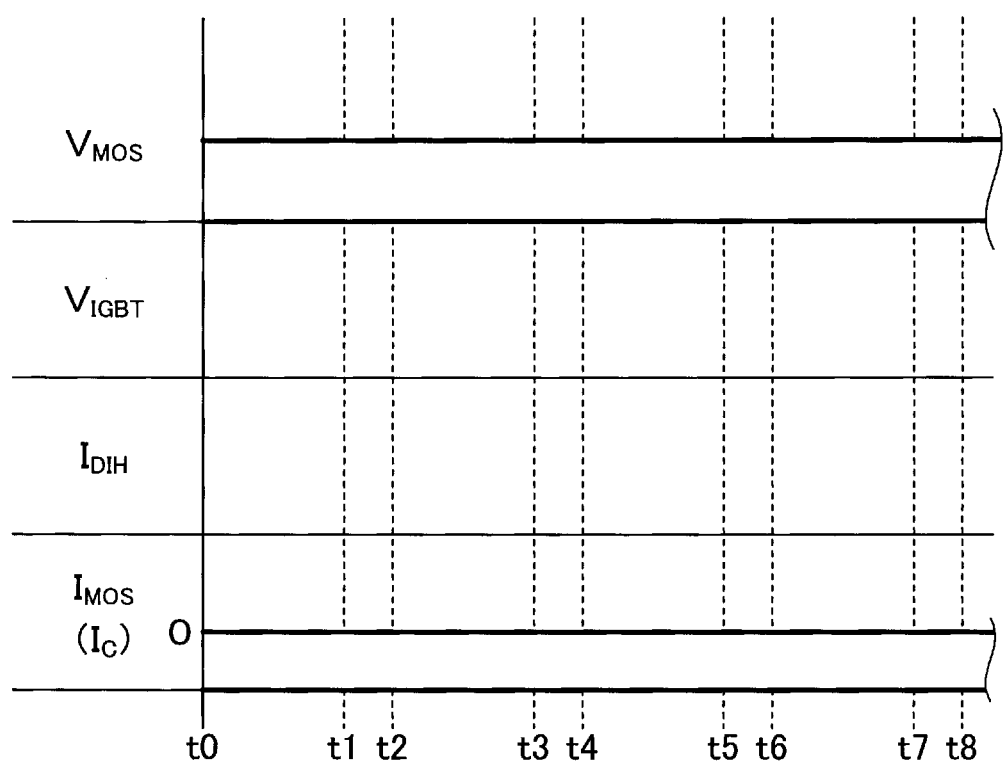
FIG. 24 is a timing diagram of the power conversion apparatus according to the eighth embodiment of the invention in the non-stepdown discharge mode.

FIG. 24 is a timing diagram of the power conversion apparatus 1 of the eighth embodiment of the invention when it operates in the non-stepdown discharge mode. As shown in this diagram, in the non-stepdown discharge mode, the IGBT 4 of the lower arm continues to be off, and the MOSFET of the upper arm continues to be on. In this non-stepdown discharge mode, the charge current $I_C$ flows through the MOSFET 2 in the direction to charge the DC power source 8.

This embodiment provides the following advantages. The MOSFET 2 disposed in the upper arm continues to be on during the non-stepdown discharge mode. Accordingly, the charge current $I_C$ can be passed to the MOSFET 2 made of wide bandgap semiconductor material and having a low on-resistance. Accordingly, it is possible to reduce the loss in the non-stepdown discharge mode. The eighth embodiment is the same in structure and advantages as the first embodiment except for the above.

The above explained preferred embodiments are exemplary of the invention of the present application which is described solely by the claims appended below. It should be understood that modifications of the preferred embodiments may be made as would occur to one of skill in the art.

What is claimed is:

1. A power conversion apparatus comprising:
 a first semiconductor element pair including a MOSFET made of wide bandgap semiconductor material and a wide bandgap diode made of wide bandgap semiconductor material which is reverse parallel-connected to the MOSFET;
 a second semiconductor element pair including an IGBT made of silicon semiconductor material and a silicon diode made of silicon semiconductor material which is reverse parallel-connected to the IGBT; and
 a control circuit section for controlling switching operation of the MOSFET and the IGBT,
 the first and second semiconductor element pairs being connected in series to each other.

2. The power conversion apparatus according to claim 1, wherein the wide bandgap diode is a Schottky barrier diode having a Schottky junction.

3. The power conversion apparatus according to claim 1, wherein the control circuit section is configured to turn on the MOSFET during a time period in which a freewheel current occurs, so that the freewheel current flows through the MOSFET.

4. The power conversion apparatus according to claim 1, wherein the first semiconductor element pair is disposed in an upper arm and the second semiconductor element pair is disposed in a lower arm, and a reactor is provided between the first and second semiconductor element pairs such that a DC voltage of a DC power source is stepped up by causing the IGBT to perform switching.

5. The power conversion apparatus according to claim 4, wherein the control circuit section is configured to operate in a stepup discharge mode in which the IGBT is caused to perform switching with the MOSFET being turned on while the IGBT is off so that the DC voltage of the DC power source is stepped up.

6. The power conversion apparatus according to claim 4, wherein the control circuit section is configured to operate in a non-stepup discharge mode in which the IGBT is caused not to perform switching and the MOSFET is kept on so that the DC voltage of the DC power source is outputted without being steeped up.

7. The power conversion apparatus according to claim 4, wherein the control circuit section is configured to operate in a non-stepdown discharge mode in which the IGBT is caused not to operate switching and the MOSFET is kept on so that DC power supplied from a load connected to the power conversion apparatus is supplied to the DC power source without being stepped down, to charge the DC power source.

8. The power conversion apparatus according to claim 1, wherein an auxiliary switching element made of one of the silicon semiconductor material and the wide bandgap semiconductor material is parallel-connected to the MOSFET.

9. The power conversion apparatus according to claim 8, wherein the auxiliary switching element is a bipolar type transistor, and the control circuit section is configured to cause only the MOSFET to perform switching if an output current of the power conversion apparatus is smaller than a predetermined value.

* * * * *